United States Patent [19]
Petracek

[11] 3,923,900
[45] Dec. 2, 1975

[54] 1-(6-METHOXY-2-NAPHTHYL)ETHYL HYDROXYMETHYLKETONE

[75] Inventor: Francis J. Petracek, Bloomington, Minn.

[73] Assignee: Riker Laboratories, Inc., Northridge, Calif.

[22] Filed: May 3, 1972

[21] Appl. No.: 250,039

[52] U.S. Cl.......... 260/590; 260/468 R; 260/468 G; 260/468 K; 260/476 C; 260/479 R; 260/485 F; 260/485 G; 260/485 H; 260/485 J; 260/485 K; 260/488 CD; 424/299; 424/308; 424/311; 424/312; 424/313; 424/331
[51] Int. Cl.²............... C07C 49/76; C07C 49/82
[58] Field of Search.......................... 260/590, 592

[56] References Cited
OTHER PUBLICATIONS
Khan et al., "J. Pharm. Pharmacol." Vol. 1, pp. 230–234, (1949).

*Primary Examiner*—Norman Morgenstern
*Attorney, Agent, or Firm*—Alexander, Sell, Steldt & DeLaHunt

[57] ABSTRACT

1-Hydroxy-3-(2-naphthyl)ketones having three to five carbon atoms and derivatives optionally substituted in positions C-1, 4, 5, 7 and 8 and/or position C-6 of the naphthyl ring are anti-inflammatory, analgesic and antipyretic agents.

2 Claims, No Drawings

1-(6-METHOXY-2-NAPHTHYL)ETHYL HYDROXYMETHYLKETONE

BACKGROUND OF THE INVENTION

Derivatives of α-(2-naphthyl)acetic acid (South African Pat. No. 67/07,597) and β-(2-naphthyl)ethanol (French Pat. No. 2,012,150) are known. However, these patents do not describe or suggest derivatives of 1-hydroxyacetone. So far as is known to applicant, 3-(2-naphthyl)derivatives of 1-hydroxyacetone have not previously been reported.

This invention relates to novel naphthyl derivatives of 1-hydroxyacetone and more particularly to 3-(2-naphthyl)derivatives of 1-hydroxyacetone, optionally substituted additionally on the 3 position of the acetone moiety, and in which the naphthyl ring may be mono-substituted at the 1, 4, 5, 6, 7, or 8 positions or disubstituted at the 6 and 1, 4, 5, 7 or 8 positions. The invention also relates to methods for using said compounds and to processes for the preparation thereof.

DETAILED DESCRIPTION OF THE INVENTION

The novel compounds of the present invention are 1-hydroxyacetone derivatives of the formula

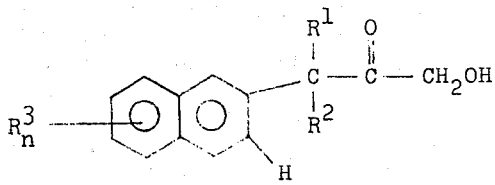

Formula I wherein one of $R^1$ and $R^2$ is hydrogen, the other is hydrogen, methyl, ethyl or difluoromethyl; or $R^1$ and $R^2$ taken together are methylene, halomethylene or ethylene; n is zero, one or two; and 1. when n is one
   a. when $R^3$ is at C-1, 4, 5, 7 or 8 it is alkyl, trifluoromethyl, fluoro, chloro, hydroxy, lower alkoxycarbonyl, lower alkoxy or lower alkylthio;
   b. when $R^3$ is at C-6 it is alkyl, cycloalkyl, hydroxymethyl, lower alkoxymethyloxy, trifluoromethyl, vinyl, ethynyl, fluoro, chloro, hydroxy, a conventional hydrolyzable ester, lower alkoxy or lower alkylthio, formyl, acetyl or aryl;
2. when n is two, one $R^3$ is at C-6 and the other is at C-1, 4, 5, 7 or 8; and $R^3$ is lower alkyl, fluoro, chloro, hydroxy, a conventional hydrolyzable ester, lower alkoxy or lower alkylthio; provided that when one of these $R^3$ is hydroxy, alkoxy or alkylthio, the other is the identical group or alkyl, fluoro, chloro or a conventional hydrolyzable ester.

This invention also relates to methods for the preparation of compounds of Formula I and methods for using the compounds as anti-inflammatories, analgesics and antipyretics.

The term halomethylene as used herein means mono- or dihalomethylene groups wherein the halogen is fluorine or chlorine, such as fluoromethylene, chloromethylene, difluoromethylene and chlorofluoromethylene.

The term alkyl as used herein means straight or branched chain hydrocarbon groups of one to six carbon atoms, such as methyl, ethyl, propyl, isopropyl, butyl, tertiarybutyl, pentyl, hexyl and the like. By the term "cycloalkyl" is meant cyclic hydrocarbon groups of three to seven carbon atoms, such as cyclopropyl, cyclopentyl, cyclohexyl and the like.

The term "alkoxy" means a straight or branched chain hydrocarbon ether group of six or less carbon atoms, including methoxy, ethoxy, 2-propoxy, propoxy, butoxy, 3-pentoxy and the like. "Alkoxymethyloxy" groupings are methylether groups substituted with one alkoxy group; typical alkoxymethyloxy groups include methoxymethyloxy, ethoxymethyloxy, isopropoxymethyloxy and the like. The term "alkylthio" means straight or branched chain hydrocarbon thioether groups of six or less carbon atoms, including methylthio, ethylthio, propylthio, 2-propylthio, 2-butylthio, pentylthio, 3-hexylthio and the like.

By the term "aryl" is intended unsubstituted and p-substituted phenyl derivatives, such as phenyl, p-tolyl, p-fluorophenyl, p-chlorophenyl, p-hydroxyphenyl, p-methoxyphenyl, p-ethylphenyl and the like.

The term "conventional hydrolyzable ester," as used herein, denotes those hydrolyzable ester groups conventionally employed in the art, preferably those derived from hydrocarbon carboxylic acids, or their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain or cyclic structure, and preferably contain from one to twelve carbon atoms. Typical conventional hydrolyzable esters thus included within the scope of the term and the instant invention are acetate, propionate, 2-methyl propionate, butyrate, valerate, caproate, caprylate, benzoate, phenylacetate, diethylacetate, trimethylacetate, t-butylacetate, cyclohexylacetate, cyclopentylpropionate, adamantoate, bicyclo[2.2.2]octyl carboxylate, hemisuccinate, hemiadipate, hemi-β,β-dimethylglutarate.

When one of $R^1$ and $R^2$ is hydrogen and the other is methyl, ethyl or difluoromethyl, the compounds of Formula I can exist as pairs of enantiomorphs, one of which exhibits greater anti-inflammatory, analgesic, antipyretic and/or antipruritic activity than the other enantiomorph.

The compounds of Formula I that exist as enantiomorphs can be administered as mixtures of enantiomorphs or as resolved enantiomorphs.

The enantiomorphs are resolved by conventional means, such as by (a) selective biological degradation; or (b) by the preparation of derivatives of the compounds of Formula I, then the separation of the diastereoisomers by fractional crystallization and finally the regeneration of the optically resolved isomers of the compounds of Formula I from their respective resolved diastereoisomers.

Alternatively, and preferably, the resolved compounds of Formula I can be prepared from the corresponding resolved starting compounds used to prepare the compounds of Formula I. The resolved compounds and their respective resolved starting compounds will not necessarily have the same optical rotation although they will have the same absolute configuration.

The compounds of the invention are useful in the treatment of inflammation of the skin, respiratory tract, musculoskeletal system, joints, internal organs and tissues. Accordingly, these compounds are useful in the treatment of conditions characterized by inflammation, such as contact dermatitis, allergic conditions, burns, rheumatism, contusion, arthritis, bone fracture, post-traumatic conditions and gout. In those cases in which the above conditions include pain, pyrexia and pruritus, coupled with the inflammation, the instant compounds are useful for the relief of these conditions as well as the inflammation. For example, the instant compounds are useful in the treatment of pain associated with post-operative conditions, post-traumatic conditions, post-partum conditions, dysmenorrhea, burns, gout, contusions, neuralgia, neuritis, headaches and rheumatic fever. As stated above, these compounds are exhibit antipyretic activity, accordingly, these compounds are useful in the treatment of pyrexia where reduction of a fever is indicated, for example, cases where high fever is associated with diseases such as rheumatic fever, bronchitis, pneumonia, typhoid fever, Hodgkin's disease and the like. The present compounds are also useful in the treatment of pruritus where the condition exists contemporaneously with inflammation, pain and/or high fever. Moreover, the compounds are useful for treating pruritus per se.

The preferred manner of oral administration provides the use of a convenient daily dosage regimen which can be adjusted according to the degree of affliction. Generally, a daily dose of from 0.01 mg. to 20 mg. of the compound of Formula I per kilogram of body weight of the mammal is employed. Most conditions respond to treatment comprising a dosage level of the order of .5 mg. to 5 mg. per kilogram of body weight per day. For such oral administration, a pharmaceutically acceptable, non-toxic composition is formed by the incorporation of any of the normally employed excipients. Suitable pharmaceutically acceptable carriers or excipients include starch, glucose, lactose, gelatin, malt, flour, chalk, magnesium carbonate, magnesium stearate, glyceryl, monostearate, talc, dried skim milk, gylcerol, water, ethanol and the like. These compositions take the form of solutions, suspensions, tablets, pills, capsules, powders, sustained release formulations and the like. In addition, these compounds can be administered in conjunction with other medicinal agents depending upon the specific condition being treated.

Preferred compounds of the invention are those wherein one of $R^1$ and $R^2$ is hydrogen and the other is hydrogen, methyl, ethyl or difluoromethyl, or $R^1$ and $R^2$ taken together are methylene or difluoromethylene. Most preferred are combinations wherein $R^1$ and $R^2$ are both hydrogen, or $R^1$ is hydrogen and $R^2$ is methyl.

It is preferred that $n$ is one or two, and most preferred that $n$ is one. When $n$ is two, one of $R^3$ must be substituted at C-6, and it is preferred that the other $R^3$ is at position C-5 or 7.

When $n$ is one, $R^3$ is preferably substituted at C-5, 6 or 7, and most preferred is C-6.

It is presently preferred that $R^3$ is methyl, ethyl, methoxy, ethoxy, trifluoromethyl, fluoro, chloro and methylthio, and most preferred is methoxy.

The presently most preferred compounds of the invention are: 1-hydroxy-3-(6-methoxy-2-naphthyl)-propanone and 1-(6-methoxy-2-naphthyl)ethyl hydroxymethyl ketone.

The compounds of the invention are conveniently prepared from the corresponding 2-naphthylacetic acid derivatives, or esters thereof, by a novel process which can be illustrated by the following reaction sequence:

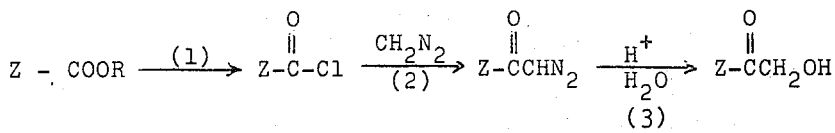

wherein R is H or a lower alkyl radical and Z is

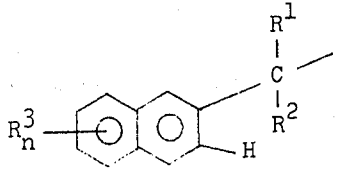

Reaction (1) uses any of the well-known methods for the preparation of acid chloride. Reaction with thionyl chloride has been found to be a very convenient route for obtaining the acid chloride from the acid.

Reaction (2) with diazomethane is a well-known reaction, discussed for example in "Organic Reactions," Vol. 1, pages 38 ff. It has been found to proceed routinely in the class of compounds described by this invention. A non-reactive solvent such as diethyl ether is used. The diazoketone is a solid or liquid which may be isolated but is generally not characterized. It is hydrolyzed as shown in step (3) under acidic conditions in a suitable solvent, for example dioxane and tetrahydrofuran, with added water. Suitable acids for providing hydrogen ions for this reaction are organic or inorganic, e.g. sulfuric, perchloric or trifluoroacetic. Strong acids are preferred, generally in low concentrations.

Compounds of the invention of Formula I wherein $n$ is one or two are prepared by the reaction sequence described hereinabove and/or appropriate transformations of one substituent to another on the structure of Formula I by methods familiar to those skilled in the art. Examples include reactions such as halogenation, hydrolysis, ether cleavage and alkylation of hydroxy groups.

When a resolved enantiomorph of Formula Z — COOR is employed in the reaction sequence described hereinabove, the corresponding resolved enantiomorph of Formula I is obtained.

The starting material compounds of the Formula Z — COOR can be prepared by any one of several methods known to the art, and are generally known (see, for example, in South African Pat. Nos. 67/07,597 and 68/04,378).

In the following examples the processes described are illustrative of procedures useful for obtaining the compounds of this invention but are not intended to be limiting. Other processes are known and may be applied by those skilled in the art to obtain the compounds of this invention.

EXAMPLE 1

6-Methoxy-2-naphthylacetic acid in dichloromethane is treated with excess thionyl chloride, and the mixture is heated to its reflux temperature and heated at reflux with stirring for several hours. Excess thionyl chloride is removed by twice adding benzene and evaporating under vacuum. Infrared spectral analysis of the product, 6-methoxy-2-naphthylacetyl chloride, is consistent with the assigned structure. It is used without further purification.

The acid chloride (10 g., 0.0426 mole) in diethyl ether (150 ml.) is gradually added to excess diazomethane in ether (250 ml.) at 0°C. The mixture is stirred for 2 hours at 0°C., then evaporated under vacuum. The purity of the solid residue is checked by thin layer chromatography on a silica gel plate and found to be good. Infrared spectral analysis of the product is consistent with the assigned structure.

All of the diazomethylketone is treated with excess 2N aqueous sulfuric acid in dioxane at 60°–65° C. for 0.5 hour. The mixture is diluted with water, then filtered to isolate the solid. Chromatography on a column of 75 percent silicic acid and 25 percent celite, followed by recrystallization from ethanol, gives light yellow plates of 1-hydroxy-3-(6-methoxy-2-naphthyl)-propanone, m.p. 126°–130° C.

Analysis: Calculated for $C_{14}H_{14}O_3$: C, 73.0; H, 6.13. Found: C, 73.4; H, 6.17.

In a similar manner, the following compounds of the invention are prepared from the corresponding acids.

TABLE I

| Ex. No. | Starting Material | Final Product |
|---|---|---|
| 2 | 6-methyl-2-naphthyl acetic acid | naphthalene with CH₃ at 6-position and -CH₂C(=O)CH₂OH substituent |
| 3 | 6-methyl-2-naphthyl-α-methyl acetic acid | naphthalene with CH₃ at 6-position and -CH(CH₃)C(=O)CH₂OH substituent |
| 4 | 7-fluoro-2-naphthyl acetic acid | naphthalene with F at 7-position and -CH₂C(=O)CH₂OH substituent |
| 5 | 5,6-dimethyl-2-naphthyl-α-methyl acetic acid | naphthalene with CH₃ at 5 and 6-positions and -CH(CH₃)C(=O)CH₂OH substituent |
| 6 | 7-chloro-2-naphthyl-α,α-methylene acetic acid | naphthalene with Cl at 7-position and -C(=CH₂)C(=O)CH₂OH substituent |
| 7 | 7-methylthio-2-naphthyl-α-ethyl acetic acid | naphthalene with CH₃S at 7-position and -CH(CH₂CH₃)C(=O)CH₂OH substituent |
| 8 | 6-chloro-2-naphthyl-α-methyl acetic acid | naphthalene with Cl at 6-position and -CH(CH₃)C(=O)CH₂OH substituent |
| 9 | 5-fluoro-2-naphthyl-α-ethyl acetic acid | naphthalene with F at 5-position and -CH(CH₂CH₃)C(=O)CH₂OH substituent |

TABLE I (continued)

| Ex. No. | Starting Material | Final Product |
|---|---|---|
| 10 | 8-trifluoromethyl-2-naphthyl-α,α-methylene acetic acid | 8-CF$_3$-naphthyl-C(=CH$_2$)-C(O)-CH$_2$OH |
| 11 | 5-chloro-2-naphthyl acetic acid | 5-Cl-naphthyl-CH$_2$-C(O)-CH$_2$OH |
| 12 | 1-methoxy-2-naphthyl acetic acid | 1-OCH$_3$-naphthyl-CH$_2$-C(O)-CH$_2$OH |
| 13 | 5-methylthio-2-naphthyl-α-methyl acetic acid | 5-SCH$_3$-naphthyl-CH(CH$_3$)-C(O)-CH$_2$OH |
| 14 | 6,7-dimethoxy-2-naphthyl-α-methyl acetic acid | 6,7-(CH$_3$O)$_2$-naphthyl-CH(CH$_3$)-C(O)-CH$_2$OH |
| 15 | 5-trifluoromethyl-2-naphthyl-α,α-difluoromethylene acetic acid | 5-CF$_3$-naphthyl-C(=CF$_2$)-C(O)-CH$_2$OH |
| 16 | 5-methylthio-2-naphthyl acetic acid | 5-SCH$_3$-naphthyl-CH$_2$-C(O)-CH$_2$OH |
| 17 | 6-methylthio-2-naphthyl-α,α-methylene acetic acid | 6-CH$_3$S-naphthyl-C(=CH$_2$)-C(O)-CH$_2$OH |
| 18 | 7-trifluoromethyl-2-naphthyl-α-methyl acetic acid | 7-CF$_3$-naphthyl-CH(CH$_3$)-C(O)-CH$_2$OH |
| 19 | 7-methoxy-2-naphthyl-α-methyl acetic acid | 7-CH$_3$O-naphthyl-CH(CH$_3$)-C(O)-CH$_2$OH |
| 20 | 6-difluoromethoxy-2-naphthyl-α-difluoromethyl acetic acid | 6-CF$_2$HO-naphthyl-C(OH)(CF$_2$H)-C(O)-CH$_2$OH |

TABLE I (continued)

| Ex. No. | Starting Material | Final Product |
|---|---|---|
| 21 | 6-methoxy-2-naphthyl-α-difluoromethyl acetic acid | 6-methoxy-naphthyl-CH(CF$_2$H)-C(=O)-CH$_2$OH |
| 22 | 6-chloro-2-naphthyl-α-difluoromethyl acetic acid | 6-chloro-naphthyl-CH(CF$_2$H)-C(=O)-CH$_2$OH |
| 23 | 6-trifluoromethyl-2-naphthyl-α-methyl acetic acid | 6-CF$_3$-naphthyl-CH(CH$_3$)-C(=O)-CH$_2$OH |
| 24 | 5-methyl-2-naphthyl-α-methyl acetic acid | 5-methyl-naphthyl-CH(CH$_3$)-C(=O)-CH$_2$OH |
| 25 | 1-chloro-2-naphthyl-α-ethyl acetic acid | 1-chloro-naphthyl-CH(CH$_2$CH$_3$)-C(=O)-CH$_2$OH |
| 26 | 4-difluoromethylthio-2-naphthyl-α-methyl acetic acid | 4-SCF$_2$H-naphthyl-CH(CH$_3$)-C(=O)-CH$_2$OH |
| 27 | 8-hydroxy-2-naphthyl-α-ethyl acetic acid | 8-OH-naphthyl-CH(CH$_2$CH$_3$)-C(=O)-CH$_2$OH |
| 28 | 6-fluoro-2-naphthyl-α-methyl acetic acid | 6-fluoro-naphthyl-CH(CH$_3$)-C(=O)-CH$_2$OH |

TABLE I (continued)

| Ex. No. | Starting Material | Final Product |
|---|---|---|
| 29 | 4-ethoxy-2-naphthyl-α,α-ethylene acetic acid | 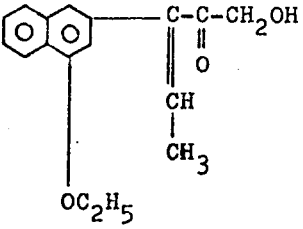 |
| 30 | 7-methyl-2-naphthyl-α-methyl acetic acid | 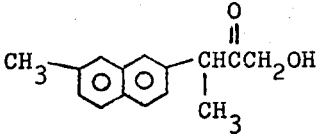 |

EXAMPLE 31 d-2-(6-Methoxy-2-naphthyl)propionic acid (6.5 g., 0.043 mole) dissolved in dichloromethane is treated with excess thionyl chloride, and the mixture is refluxed for three hours with stirring. Benzene is added, and the excess thionyl chloride is removed by twice azeotroping the solvents away in vacuo. Infrared spectral analysis of the product is consistent with the assigned structure. The product, d-2-(6-methoxy-2-naphthyl)propionyl chloride, is used without further purification.

The acid chloride obtained above is dissolved in diethyl ether and is added dropwise to a solution of diazomethane (in excess) in ether while stirring at 0° C. The mixture is stirred at 0° C. for 2 hours, then evaporated under vacuum. The solid residue is checked for purity by thin layer chromatography on a silica gel plate and found to be essentially all diazomethylketone.

The diazomethylketone is then treated with 0.5 N perchloric acid in dioxane at 60° to 65° C. for 0.5 hour. The mixture is diluted with water, and the precipitated solid product is isolated by filtration. Purification is by chromatography on a column of 75 percent silicic acid and 25 percent celite, followed by recrystallization from an ethanol-water mixture to give fine colorless needles of d-1-(6-methoxy-2-naphthyl)ethyl hydroxymethylketone, m.p. 92°–94° C.

Analysis: Calculated for $C_{15}H_{16}O_3$: C, 73.75; H, 6.60. Found: C, 73.70; H, 6.73.

What is claimed is:

1. The compound 1-(6-methoxy-2-naphthyl)ethyl hydroxymethylketone.

2. The compound d-1-(6-methoxy-2-naphthyl)ethyl hydroxymethylketone.

* * * * *